(12) United States Patent
Hamlin

(10) Patent No.: US 6,907,241 B2
(45) Date of Patent: Jun. 14, 2005

(54) NETWORK FOR TRANSMISSION OF BROAD-BAND SIGNALS

(75) Inventor: Derrick John Hamlin, Rochester (GB)

(73) Assignee: BAE Systems PLC, London (GB)

(*) Notice: Subject to any disclaimer, the term of this patent is extended or adjusted under 35 U.S.C. 154(b) by 647 days.

(21) Appl. No.: 09/961,685

(22) Filed: Sep. 25, 2001

(65) Prior Publication Data
US 2002/0056111 A1 May 9, 2002

(30) Foreign Application Priority Data

Sep. 25, 2000 (GB) .............................................. 0023709
Sep. 6, 2001 (GB) .............................................. 0121576

(51) Int. Cl.⁷ .............................................. H04Q 7/20
(52) U.S. Cl. ...................... 455/430; 455/3.01; 455/13.1
(58) Field of Search ............................... 455/3.01–3.06, 455/430–431, 12.1, 13.1, 18, 427; 725/62–66, 74–76; 701/13–14; 348/143–144, 148; 340/506, 539.1, 945–948

(56) References Cited

U.S. PATENT DOCUMENTS

| 5,428,600 | A | | 6/1995 | Potier | 370/215 |
| 5,742,336 | A | * | 4/1998 | Lee | 348/144 |
| 5,832,187 | A | * | 11/1998 | Pedersen et al. | 706/45 |
| 6,061,562 | A | * | 5/2000 | Martin et al. | 455/431 |
| 6,092,008 | A | * | 7/2000 | Bateman | 701/14 |
| 6,529,706 | B1 | * | 3/2003 | Mitchell | 455/12.1 |

FOREIGN PATENT DOCUMENTS

| DE | 19856231 | 6/2000 |
| FR | 2652701 | 4/1991 |
| JP | 1274087 | 11/1989 |
| WO | 01/03437 | 1/2000 |

* cited by examiner

Primary Examiner—George Eng
(74) Attorney, Agent, or Firm—Crowell & Moring LLP

(57) ABSTRACT

Airborne units (2) acquire images as electronic signals either directly or indirectly from first ground based units (2a) and transmit them by broad band radio to second ground based units (3, 4), either directly or indirectly via second airborne units (1), which units (3, 4) record the received image signals for a period of time sufficient to permit a section of the received image to be selected by narrow bandwidth means (5, 6).

7 Claims, 1 Drawing Sheet

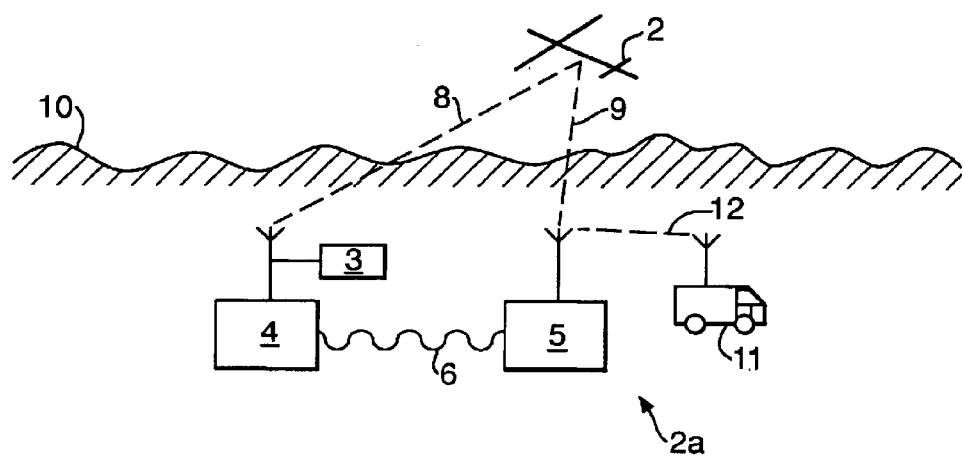
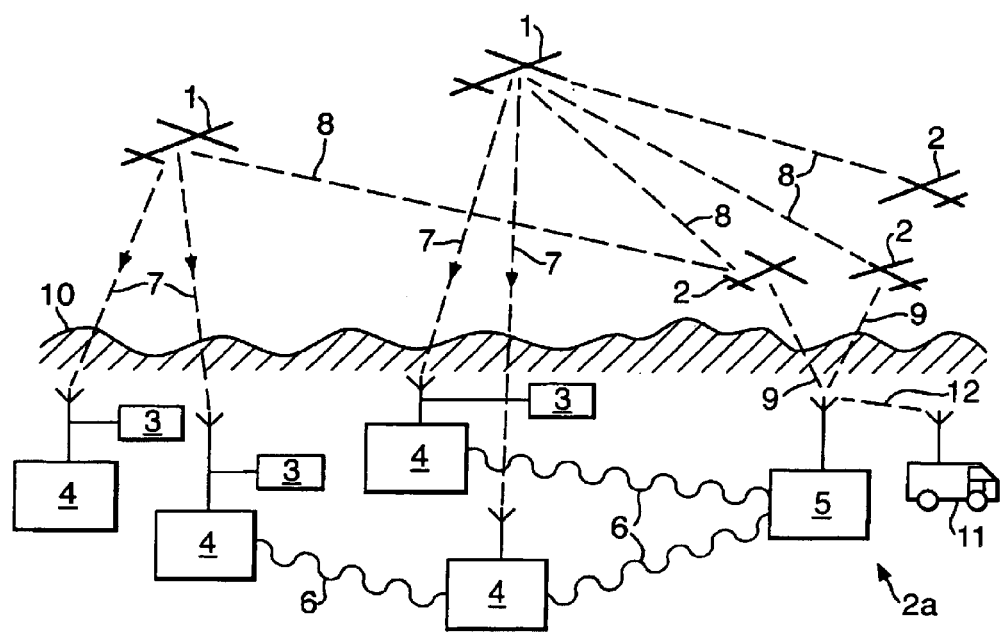

NETWORK FOR TRANSMISSION OF BROAD-BAND SIGNALS

FIELD OF THE INVENTION

This invention relates to a closed circuit television network specifically, but not exclusively, suitable for acquiring and transmitting images in electronic form.

BACKGROUND OF THE INVENTION

Current operation of surveillance and reconnaissance aircraft requires radio equipment to transmit moving television camera and radar images through antennas mounted on the aircraft to antennas and suitable receivers on other aircraft or on ground units or on spacecraft. The transmitting aircraft which may retransmit or relay signals received from other sources, may be unmanned aircraft capable of remaining on station for many hours. The transmissions are normally organised as point to point transactions. Broadcast transmission from the aircraft is also used when multiple users require the same information simultaneously. In certain locations and operations the bandwidth available for radio or telephony transmission of the images is severely constrained. If more than a single channel of point to point transmission is required the electromagnetic bandwidth utilisable is further constrained. This may require restraint within internationally agreed radio bands and restraint when required to operate over undulating terrain that might inhibit line of sight transmission.

Transmission of broadband (wideband) video signals can be carried out by fibre-optic telephone lines. These possess sufficient bandwidth to carry multiple television channels but may be fragile or difficult to install in some locations. Otherwise telephony is mainly restricted to low bandwidth information and intermittent image frames.

Television signals may be transmitted via orbiting satellites which is good for distributing multiple television channels but with a high cost of ownership and high use costs. Additionally access to the satellites may not be under the control of the user.

OBJECTS OF THE INVENTION

Thus one object is a closed circuit television network which is able to handle both multiple broad-band and low bandwidth signals whilst economising on the use of the electromagnetic spectrum.

This and other objects and advantages of the present invention will become more apparent from details disclosed in the following specification where preferred embodiments of the invention are described.

SUMMARY OF THE INVENTION

According to a first aspect of the present invention there is provided a closed circuit television network including at least one first ground based unit having narrow bandwidth signal transmission and broad bandwidth radio receiving equipment, at least one first airborne vehicle having broad bandwidth radio transmitting equipment and means for acquiring, either directly or indirectly, images as electronic signals, and at least one second ground based unit having broad bandwidth radio receiving and recording equipment for receiving and recording the electronic image signals from the first airborne vehicle and for receiving and recording, a narrow bandwidth signal from the first ground based unit, which second ground based unit is operable to select images from the recorded electronic image signals according to the narrow bandwidth signals received from the first ground based unit.

Advantageously the network includes at least one second airborne vehicle having broad bandwidth radio transmitting and receiving equipment for receiving by radio said electronic signals from the first airborne vehicle and for relaying the received electronic signals to the at least one second ground based unit.

Preferably the or each first airborne vehicle has means, including sensors, for directly acquiring images as electronic signals.

Conveniently the or each first ground based units has means, including sensors, for directly acquiring images as electronic signals.

Advantageously the ground based radio receiving, transmitting and recording unit includes an image analyser for selecting desired signals from the received combined electronic image signals.

Preferably the first ground based unit includes a local image analyser for selecting desired signals from the received image signals.

Conveniently the narrow bandwidth first ground based unit and the second ground based broad bandwidth receiving, transmitting and recording unit include narrow bandwidth communication means for receiving and transmitting electronic image signals therebetween.

DESCRIPTION OF THE DRAWINGS

For a better understanding of the present invention, and to show how the same may be carried into effect, reference will now be made, by way of example, to the accompanying drawings in which FIG. 1 shows diagrammatically a closed circuit television network according to a first embodiment of the present invention, and FIG. 2 shows diagrammatically a closed circuit television network according to a second embodiment of the present invention.

DESCRIPTION OF EMBODIMENTS OF THE INVENTION

A closed circuit television network according to the present invention includes at least one first ground based unit generally indicated in FIG. 1 of the accompanying drawings at 2a. The first ground based unit 2a has narrow bandwidth signal transmission and broad bandwidth radio receiving equipment and conveniently includes one or more mobile ground covering vehicles 11. The network includes at least one first airborne vehicle preferably in the form of aircraft 2 having broad bandwidth radio transmitting and means for acquiring, either directly or indirectly, images as electronic signals. The aircraft 2 may have means, including sensors, for acquiring the images directly or may be provided with images as electronic signals acquired by acquiring means, including sensors, on the vehicles 11. The image acquiring means may be provided on both the aircraft 2 and the vehicles 11.

At least one second ground based unit having broad bandwidth radio receiving and recording equipment (3, 4) is provided for receiving and recording the electronic image signals (8) from the first airborne vehicle or aircraft 2 and for receiving and recording a narrow bandwidth signal 6 from the first ground based unit 2a. The second ground based unit includes one or more separated recorders 3 for receiving and recording the electronic image signals 8 and at least one remote image analyser 4 in operative association with at least one of the recorders 3. The purpose of the remote image analyser 4 is to receive and record a narrow bandwidth signal 6 received from a local image analyser 5 which forms part of the first ground based unit 2a and which is associated with the vehicles 11. The remote image analyser 4 is operable to select images from the recorded electronic signals according to the narrow bandwidth control signals 6 received from the local image analyser 5 of the first ground based unit 2a.

The first ground based unit 2a and the second ground based unit include narrow bandwidth communication means for receiving and transmitting electronic image signals therebetween. Conveniently such means include telephones or radios having narrow bandwidths, such as HF or VHF radios which operate over the links 6 illustrated in FIG. 1. In this way the local image analyser 5 may control the receivers and recorders 3 in a similar manner to the control provided by the remote analyser 4.

FIG. 2 of the accompanying drawings shows diagrammatically a closed circuit television network according to a second embodiment of the present invention. The second embodiment of FIG. 2 is basically similar to the first embodiment of FIG. 1 and like parts are referenced the same in both embodiments and will not be further described in detail. The network of FIG. 2 also includes at least one second airborne vehicle, conveniently in the form of aircraft 1, having broad bandwidth radio transmitting and receiving equipment for receiving by radio the electronic signals from the first airborne vehicle 2. The aircraft 1 also carries means for combining the received electronic image signals. The aircraft 1 and 2 and the first ground based unit 2a are operated at altitudes amongst themselves with respect to terrain 10 to receive and transmit radio signals without being screened by the terrain. The aircraft 1 act as means for relaying the image signals 8 from the aircraft 2 to the one or more separated recorders 3 and remote image analyser 4 via transmission paths 7. The purpose of the remote image analyser 4 is to select signals from the received combined electronic image signals and to select images according to the narrow bandwidth control signals from the first ground based unit 2a. Aircraft 1 carry radio equipment with adequate bandwidth to receive and transmit single and multiple television signals which signals may be compressed by an additional computing unit on the aircraft according to well known algorithms such as MPEG2.

The various separate signals on transmission paths 7, 8, 9 are generated according to the usual transmission band conventions in order to avoid interference between the signals. The transmission beam widths associated with signals on transmission paths 7 may be chosen as part of the design of the transmitter antennas to cover the intended users, receivers and recorders 3 on the terrain 10.

As the electronic image signals are generated and relayed to the terrain 10 almost instantaneously they can be monitored on a television receiver by an operator in real-time if desired whilst being simultaneously recorded. The recorders 3 continue to store the received signals for a substantial period of time (for example 6 hours) such that a section of the recorded signal might be selected on demand. The user of the receiver and recorder 3 can make the selection in the manner common with recording systems. In this way images from ground or airborne sources can be transmitted to a number of remote distributed end users for the purpose of offering them access to selected sequence of image takes. The sequences may be selected after substantial analysis by the analysers 4 or 5. This may be, for example, to aid the users in interpreting the parts of the imagery relevant to themselves without having to repeat the analysis. Thus multiple broad bandwidth signals may be distributed and exploited both in close to real-time and subsequently, in retrospect, according to prompts and instructions passed over narrow bandwidth telephone systems via links 6. The vehicles 11 may communicate directly with the local image analyser 5 by radio as at 12 and in turn the local image analyser 5 may communicate by radio with the aircraft 2 as shown at 9 on FIG. 1 of the accompanying drawings. The aircraft 1 may communicate with the aircraft 2 and vice versa by radio as shown at 8 in FIG. 2 of the accompanying drawings.

Various modifications and alterations may be made to the embodiments of the present invention described and illustrated, within the scope of the present invention as defined in the following claims.

What is claimed is:

1. A closed circuit television network including at least one first ground based unit having narrow bandwidth signal transmission and broad bandwidth radio receiving equipment, at least one first airborne vehicle having broad bandwidth radio transmitting equipment and means for acquiring, either directly or indirectly, images as electronic image signals, and at least one second ground based unit having broad bandwidth radio receiving and recording equipment for receiving and recording the electronic image signals from said at least one first airborne vehicle and for receiving and recording a narrow bandwidth signal from said at least one first ground based unit, which at least one second ground based unit is operable to select images from the recorded electronic image signals according to the narrow bandwidth signal received from said at least one first ground based unit.

2. A network according to claim 1, including at least one second airborne vehicle having broad bandwidth radio transmitting and receiving equipment for receiving by radio said electronic image signals from said at least one first airborne vehicle and for relaying the received electronic signals to the at least one second ground based unit.

3. A network according to claim 1, wherein the at least one first airborne vehicle has means, including sensors, for directly acquiring images as electronic signals.

4. A network according to claim 1, wherein the at least one first ground based unit has means, including sensors, for directly acquiring images as electronic signals.

5. A network according to claim 1, wherein each of the at least one first ground based unit and at least one second ground based unit includes an image analyser for selecting desired signals from the receiving electronic image signals.

6. A network according to claim 1, wherein said at least one first ground based unit includes a local image analyser for selecting desired signals from the received electronic image signals.

7. A network according to claim 1, wherein each of the at least one first ground based unit and at least one second ground based unit include narrow bandwidth communication means for receiving and transmitting electronic image signals therebetween.

\* \* \* \* \*